United States Patent [19]

Kamaya

[11] Patent Number: 4,705,198
[45] Date of Patent: Nov. 10, 1987

[54] REINFORCED ROOF CARRIER STRUCTURE FOR A VEHICULAR AUTOMOBILE

[75] Inventor: Masashi Kamaya, Tokyo, Japan
[73] Assignee: Piaa Corporation, Tokyo, Japan
[21] Appl. No.: 876,429
[22] Filed: Jun. 20, 1986
[51] Int. Cl.[4] .................................................. B60R 9/00
[52] U.S. Cl. ...................................... 224/329; 224/322
[58] Field of Search ............... 224/329, 330, 328, 309, 224/331, 42.03 B, 314, 325, 322

[56] References Cited

U.S. PATENT DOCUMENTS 2,357,203  8/1944  Jimmes ........................... 224/329 X

*Primary Examiner*—Henry J. Recla
*Assistant Examiner*—David Voorhees
*Attorney, Agent, or Firm*—Oblon, Fisher, Spivak, McClelland, & Maier

[57] ABSTRACT

A reinforcing device for a roof carrier, which includes a reinforcing member having a crossbar for placing and fixing an object to be carried thereon, a pair of stands for supporting the crossbar, the stands having holes extending therethrough, a pair of mounting members separate from the pair of stands and interconnecting the roof and the pair of stands on the roof, a wire made of a flexible material, mounting metal members respectively coupled to opposite ends of the wire, a screw rod projecting outward from the mounting metal members, wherein the screw rods extend through the holes formed in the stands in the vicinity of end portions thereof, and first and second clamp nuts engaged with threaded portions of the screw rods and contacting an outer side portion of the mounting members. In an alternate embodiment, the reinforcing device includes a wire made of a flexible material; mounting metal members respectively coupled to opposite ends of the wire; a screw rod projecting outward from each of mounting metal members, wherein the screw rods extend through the holes formed in stands in the vicinity of end portions thereof, and first and second clamp nuts respectively engaged with threaded portions of the screw rods and contacting an outer side portion of the mounting members.

2 Claims, 4 Drawing Figures

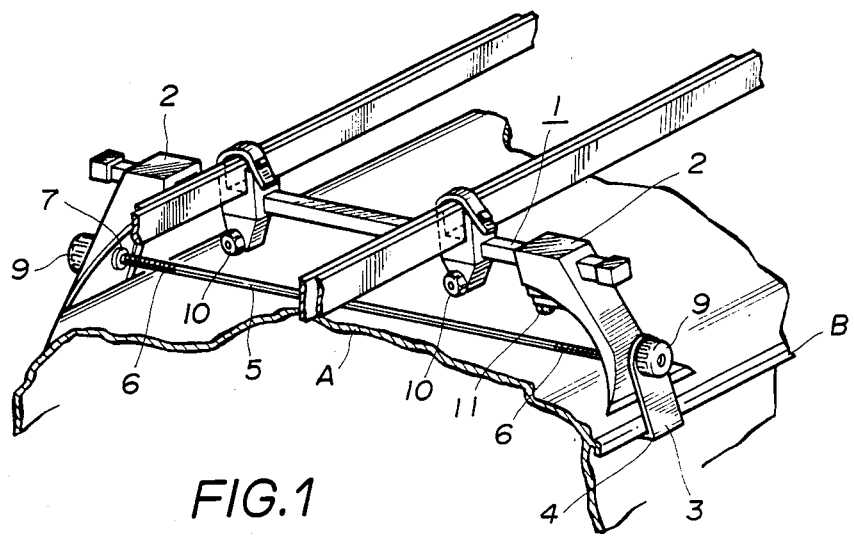
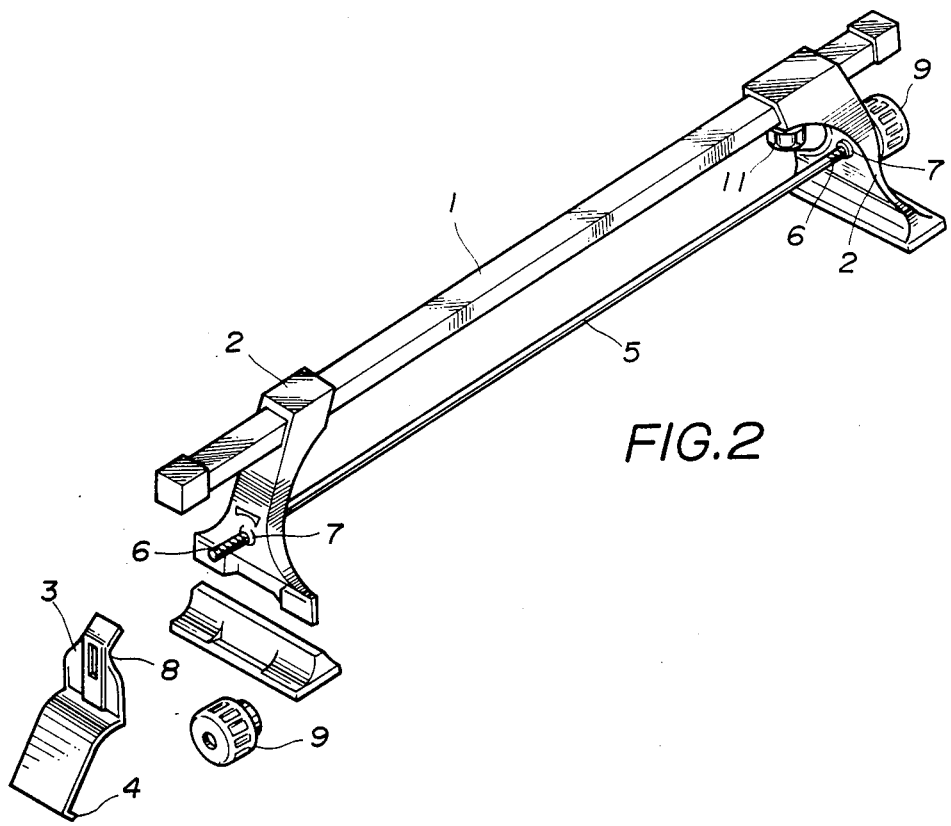

REINFORCED ROOF CARRIER STRUCTURE FOR A VEHICULAR AUTOMOBILE

FIELD OF THE INVENTION

The present invention relates to a roof carrier for a vehicle and, more particularly, to a structure for reinforcing the roof carrier so that it will not be disengaged by vibration of the vehicle.

DESCRIPTION OF THE PRIOR ART

A roof carrier consists of a crossbar for placing and fixing skis, surfing gear, and the like, thereon, and a pair of stands for attaching the crossbar on the roof of a vehicle. When the stands are mounted on the vehicle, an end portion of each stand is engaged with a gutter-like portion on each side of the vehicle, and is supported thereby. Conventionally, however, the gutter-like portion does not have sufficient depth and the portion thereof which engages with the stand is small, thereby making it likely that the roof carrier will be undesirably disengaged therefrom. Therefore, the stands or a carried object tend to become detached, thus causing an accident.

SUMMARY OF THE INVENTION

According to an aspect of the present invention, there is provided a cross-stretcher having screw portions provided on its two ends, wherein the farther ends of the screw portions extend through end portions of the stands, and the cross-stretcher is fixed by clamp nuts to reinforce a roof carrier. More specifically, when the nut is clamped, the lower portions of the two stands are drawn inward. In other words, a load constantly acts to pull the roof carrier inward against the two sides of the vehicle, securely engaging the stands with gutter-like portions of the vehicle without fear of disengagement. According to a second aspect of the present invention, with further studies and experiments, it was found that the cross-stretcher should not be rigid but is preferably a twisted or non-twisted wire made of a strong material such as metal, fiber, or resin, thereby obtaining a more effective reinforcing means. More specifically, when the vehicle is moving, its vibration acts to flex the roof carrier. In the present invention, the roof carrier is reinforced with the flexible material, such as a wire, so that a force for restoring the flexure characteristic to the initial state constantly acts on the roof carrier. Since the wire extends between the lower portions of the two stands together with a force for drawing the lower portions of the stands inward, i.e., a force that acts against the two sides of the vehicle to pull the roof carrier inward, the stands are securely engaged with the gutter-like portions of the vehicle.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 1 and 2 show an embodiment of the present invention, in which FIG. 1 is a front view of a roof carrier mounted on a vehicle, and FIG. 2 is an exploded view thereof; and FIGS. 3 and 4 show another embodiment of the present invention, in which FIG. 3 shows the roof carrier mounted to the vehicle, and FIG. 2 is an exploded view thereof.

DESCRIPTION OF THE PREFERRED EMBODIMENTS

Figure 3:
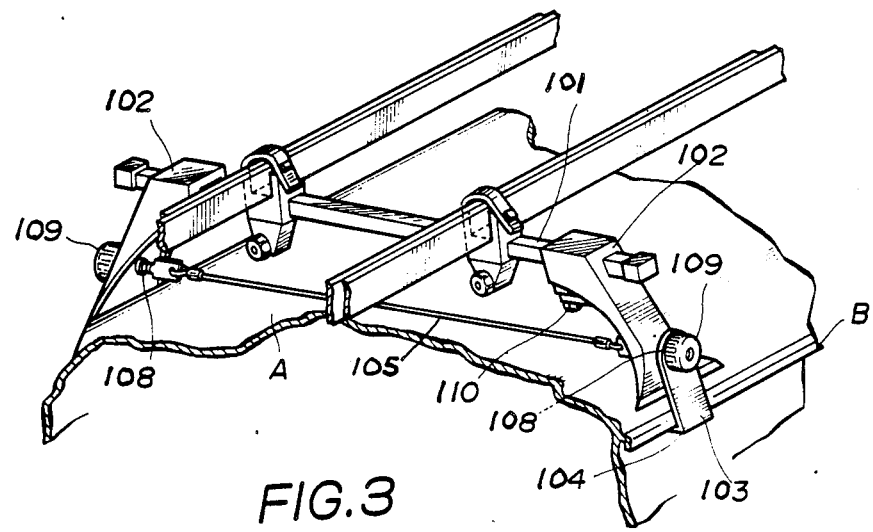

A first embodiment of the present invention will be described with reference to FIGS. 1 and 2.

A crossbar 1 has a plurality of mounting members for securing an object, such as a pair of skis, thereon. Each of a pair of stands 2 has an upper portion through which a side portion of the crossbar 1 passes. Mounting pieces 3 extend downward along the stands 2 from their lower ends. Lower side portions of the mounting pieces 3 slightly flange upward, thereby constituting rise portions 4. A cross-stretcher 5 extends between the lower portions of the two stands 2. Screw portions 6 are formed on the two ends of the cross-stretcher 5 to extend outward from the mounting pieces 3 through holes 7 and 8 in the stands 2 and the mounting pieces 3, respectively. Clamp nuts 9 are screwed onto the two ends of the cross-stretcher 5. Note that reference numeral 11 denotes a bolt mounted on each stand 2 to fix it to the crossbar 1 and numeral 10 indicates adjustment nuts.

As shown in FIG. 1, the stands 2 and the crossbar 1 supported thereby are placed on the roof of a vehicle A. The flange portions 4 of the mounting pieces 3 are engaged with gutters B of the vehicle. The stands 2 are fixed on the crossbar 1 by screwing the bolts 11 mounted on the stands 2. Then, the clamp nuts 9 of the cross-stretcher 5 are rotated so that the lower portions of the stands 2 are urged inward through the mounting pieces 3. In other words, the two sides of the roof carrier are urged inward against the sides of the vehicle, and the engagement of the gutters B with the rise portions 4 becomes secure. In this manner, according to the present invention, the crossbar 1 and the stands 2 are fixed through the bolts 10 provided on the stands 2. As a result, the fixed portions serve as a fulcrum, and the cross-stretcher 5, serving to urge the lower portions of the stands 2 inward, pulls on the gutter portions of the vehicle from both sides. Therefore, the stands and similar structure can be prevented from becoming disengaged from the vehicle.

A second embodiment of the present invention will be described with reference to FIGS. 3 and 4.

A crossbar 101 has a plurality of mounting members 103 for securing an object, such as a pair of skis, thereon. Each of a pair of stands 12 has an upper portion through which a side portion of the crossbar 101 passes. Mounting pieces 103 extend downward along the stands 102 from their lower ends. Lower side portions of the mounting pieces 103 are slightly raised upward, thereby constituting flange portion 104. A wire 105 extends between the lower portions of the two stands 102. The two end portions of the wire 105 are fixed by mount metal members 106. The outer ends of the metal members 106 are fused with screw rods 107 to extend through through holes 108 formed in the lower portions of the stands 102, and project outward from the stands 102. Clamp nuts 109 are engaged with the projecting portions of the metal members 106. Note that reference numeral 110 denotes a bolt mounted on each stand 102 to fix it to the crossbar 101.

Figure 4:
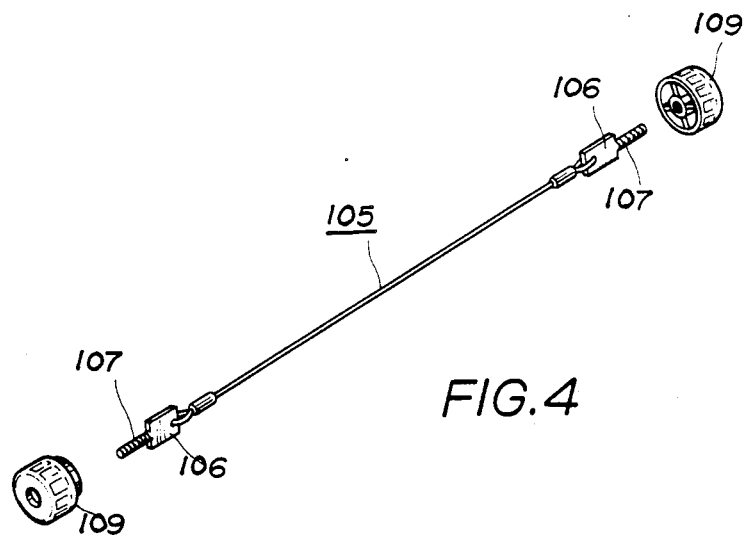

As shown in FIG. 3, the stands 102 and the crossbar 101 supported thereby are placed on the roof of a vehicle A. The flange portions 104 of the mounting pieces 103 are engaged with gutters B of the vehicle. The stands 102 are fixed with the crossbar 101 by screwing the bolts 110 mounted on the stands 102. Then, the clamp nuts 109 of the wire 105 are rotated so that the wire 15 extends tautly through the mounting metal members 106. In other words, the two sides of the roof carrier are urged inward against the sides of the vehicle A, and the engagement of the gutters B with the flange portions 104 becomes secure. In addition, even if horizontal vibration occurs while the vehicle is moving, the wire 105 is not flexed since it is made of a flexible material, but instead a force to restore the flexure of the roof carrier to the initial state. Therefore, the roof carrier can be mounted on the vehicle roof in a constantly stable manner, thereby preventing an object being carried on the roof carrier from being disengaged therewith.

What is claimed is:

1. a reinforcing device for a roof carrier of a vehicle having a roof with side gutters, comprising:
   a reinforcing member having a crossbar having opposite ends for placing and fixing an object to be carried thereon;
   a pair of stands slidably mounted to said opposite ends, respectively, for supporting said crossbar on said vehicle roof, said stands having holes extending therethrough;
   a pair of mounting members having means for engaging said gutters and being separate from said pair of stands for securing said pair of stands on said vehicle roof, said mounting members having holes extending there through in alignment with the holes in said stands;
   a wire made of a flexible material;
   first and second metal members respectively coupled to opposite ends of said wire;
   a screw rod projecting outward from each of said metal members, wherein said screw rods extend through said holes formed in said stands and in said mounting members in the vicinity of end portions thereof; and
   first and second clamp nuts engaged with threaded portions of said screw rods and contacting an outer side portion of said mounting members, thereby to clamp said roof carrier to said vehicle roof.

2. A reinforcing device for a roof carrier, of a vehicle having a roof with side gutters comprising:
   a crossbar having opposite ends for placing and fixing an object to be carried thereon; a pair of stands slidably mounted to said opposite ends, respectively for supporting said crossbar on said vehicle roof, said stands having holes extending therethrough;
   a pair of mounting members having means for engaging said gutters and being separate from said pair of stands for securing said pair of stands on said vehicle roof, said mounting members having holes extending therethrough in alignment with the holes in said stands;
   a rod-like cross stretcher having two threaded end portions extending through said holes in said stands and in said mounting members in the vicinity of ends thereof; and
   first and second clamp nuts for respectively engaging with the threaded portions and contacting outer surfaces of said mounting members thereby to clamp said roof carrier to said vehicle roof.

* * * * *